Oct. 29, 1929.

E. N. CUMMINGS 1,733,650

SEPARABLE FASTENER

Filed Jan. 29, 1926

Inventor:
Edward N. Cummings
by Emery, Booth, Janney & Varney
Attys.

Patented Oct. 29, 1929

1,733,650

UNITED STATES PATENT OFFICE

EDWARD N. CUMMINGS, OF AMESBURY, MASSACHUSETTS, ASSIGNOR TO G. W. J. MURPHY COMPANY, OF AMESBURY, MASSACHUSETTS, A CORPORATION OF MASSACHUSETTS

SEPARABLE FASTENER

Application filed January 29, 1926. Serial No. 84,610.

The object of the present invention is to provide an improved separable fastener of the type having a male member which enters and is locked in a socket, the improvements providing more particularly for facilitating the engagement of these parts. It finds particular application to those fasteners having a cross-bar or head adapted to enter an oblate aperture and to be turned to engage behind the margins thereof and by way of example I shall herein disclose such a fastener having a male member mounted on an automobile curtain and a socket secured to the automobile body.

The construction of the illustrative embodiment of my invention just referred to will be readily understood by reference to the following description taken in connection with the accompanying drawings thereof, wherein.

Figure 1:
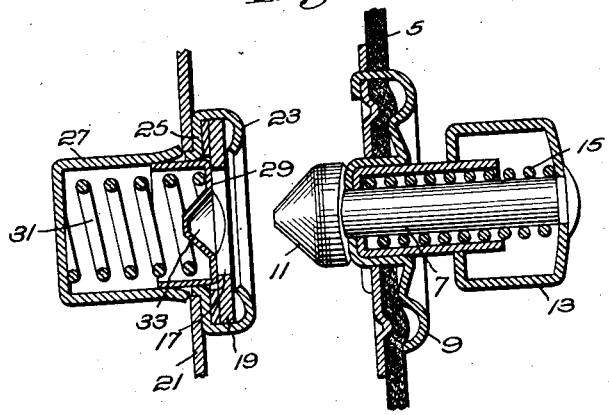
Fig. 1 is a central vertical section with the parts of the fastener in disengaged position.
Figure 2:
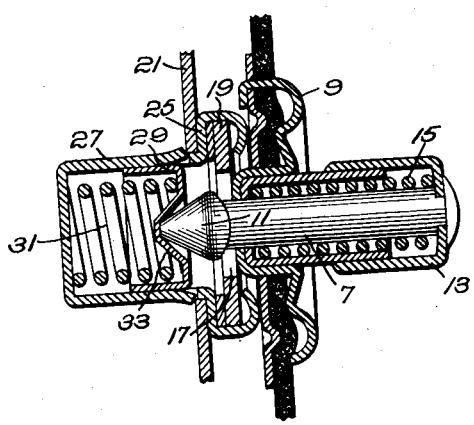
Fig. 2 is a similar view showing the parts engaged.
Figure 3:
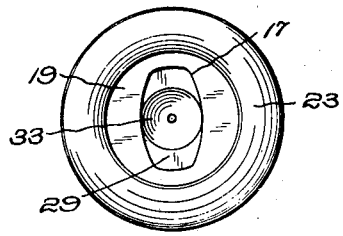
Fig. 3 is a front elevation of the socket member.

The construction herein shown resembles in some respects that disclosed in the co-pending application of George M. McGinley, Serial No. 80,393, filed Jan. 11, 1926, and the male member of the fastener mounted on the curtain 5 may embody the shank 7 swivelled in the body 9 of the fastener which is secured to the curtain, the inner end of this shank carrying the oblate cross-bar or head 11 and the outer end the manipulating head or handle 13. The shank is normally pressed toward the right in the figure by the spring 15 interposed between head 13 and the base 9 of the fastener. The head 11 may be inserted through the oblate opening 17 of the fastener socket and turned to engage behind the margins thereof at the extremities of its minor axis, as shown in Fig. 2, and is held tensioned against these margins by the spring 15.

Herein the opening 17 is formed in a plate 19 which may be supported substantially flush with the metal panel 21 forming a portion of the automobile body and I have herein shown it as held thereagainst by means of the rolled-over edge 23 of the annulus 25 which lies against the outer face of the body panel 21. This annulus is herein shown as a flange at the end of a cup-shaped member 27 seated in a suitable hole in the plate 21 and providing a housing in which slides a follower 29 normally pressed toward the right by the spring 31. The follower 29 closes the opening 17 at the interior, when the parts are disengaged, and, when the parts are engaged, is displaced toward the left in the manner shown in Fig. 2, and may then serve to assist in maintaining the head 11 in engaged position.

In accordance with my invention the head 11 is pointed or conoidal, that is, approximately in the form of a cone, and I preferably make its outer surface more or less convex so that it approaches in configuration a conoid in the more limited sense of the word. The rearmost end thereof is considerably smaller than the shorter dimension of the oblate opening 17 and thus may enter the same even if the length of the cross-head is not aligned with the longer dimension of the opening and the sides of the head will then rest against the sides of the opening. Thus, when it is desired to engage the fastener, the head being hidden, at least in part, by the intervening curtain which it is desired to secure, if the pointed head in any way enters the recess, it will be temporarily positioned and may be easily turned by the manipulating handle 13 at the exterior of the curtain until it is properly aligned to be pushed in through the opening 17 to be turned behind the plate 19.

Further to facilitate the bringing together of the parts of the fastener and their proper alignment preparatory to their actual engagement, the flange 23 which retains the plate 19 is preferably curled as shown, as distinguished from being bent down flat, thus providing an incurving guiding wall which, if engaged by the end of the head 11, will tend to permit it to slip down toward the opening 17.

The follower 29 is preferably provided, as shown, with a conoidal recess 33 facing the rear of the opening 17, this recess preferably being circular in section. Not only does this recess provide a suitable clearance permitting the head to enter the opening 17 while preserving the closure of this opening from the rear, but it is adapted in itself to receive the extreme point of the head and by its in-sloping walls permits and facilitates the guiding and centering of the head with respect to the opening 17 so that a slight rotation thereof by means of the button or head 13 is all that is necessary to align it with opening 17 to permit it to pass the same for locking purposes. The follower 29 with the recess 33 is preferably stamped from sheet metal so that the recess forms a rearwardly extending boss adapted to be embraced by the spring 31 and providing a seat for the same.

I have described in detail the particular embodiment of my invention shown by way of example in the accompanying drawings. Obviously the mechanical structure might be widely varied without departing from the principles exemplified by this disclosure. The detailed character of the description is therefore not to be understood as in any way definitive of the scope of the invention.

What I do claim and desire to secure by Letters Patent I shall express in the following claims:

1. Fastening means comprising a socket member having an oblate aperture, a depressible closure for the aperture having a conoidal recess facing the aperture and a cooperating member having a rotatable crosshead to enter the aperture and be locked with the socket member, said cross-head having a conoidal end for engagement in the conoidal recess, to be centered thereby prior to rotating the cross-head, to secure the fastening members together.

2. Fastening means comprising a socket member having an oblate aperture, a depressible closure underlying the aperture, means providing a central conoidal recess in the closure opening toward the oblate aperture and a male member having an axially movable rotatable head to enter the aperture and be secured to the socket member at the farther side of the oblate aperture, said male member having a pointed end to enter the recess to be centered thereby.

In testimony whereof, I have signed my name to this specification.

EDWARD N. CUMMINGS.